(12) United States Patent
Choudhary et al.

(10) Patent No.: US 12,032,500 B2
(45) Date of Patent: Jul. 9, 2024

(54) SYSTEM, APPARATUS AND METHOD FOR CONTROLLING TRAFFIC IN A FABRIC

(71) Applicant: Intel Corporation, Santa Clara, CA (US)

(72) Inventors: Swadesh Choudhary, Mountain View, CA (US); Ajit Krisshna Nandyal Lakshman, Hillsboro, OR (US); Doddaballapur Jayasimha, Saratoga, CA (US)

(73) Assignee: Intel Corporation, Austin, TX (US)

( * ) Notice: Subject to any disclaimer, the term of this patent is extended or adjusted under 35 U.S.C. 154(b) by 684 days.

(21) Appl. No.: 17/022,212

(22) Filed: Sep. 16, 2020

(65) Prior Publication Data
US 2020/0409880 A1 Dec. 31, 2020

(51) Int. Cl.
*G06F 13/20* (2006.01)
*G06F 13/42* (2006.01)

(52) U.S. Cl.
CPC .......... *G06F 13/20* (2013.01); *G06F 13/4282* (2013.01); *G06F 2213/0026* (2013.01)

(58) Field of Classification Search
CPC ................. G06F 13/20; G06F 13/4282; G06F 2213/0026
See application file for complete search history.

(56) References Cited

U.S. PATENT DOCUMENTS

| | | | | |
|---|---|---|---|---|
| 9,489,304 | B1* | 11/2016 | Swarbrick | G06F 13/00 |
| 10,346,342 | B1* | 7/2019 | Davis | G06F 13/4068 |
| 2010/0281231 | A1 | 11/2010 | Krishnan et al. | |
| 2011/0153724 | A1 | 6/2011 | Raja et al. | |
| 2013/0151782 | A1* | 6/2013 | Liu | G06F 12/0831 |
| | | | | 711/146 |
| 2016/0012010 | A1* | 1/2016 | Ganapathy | G06F 9/4411 |
| | | | | 712/35 |
| 2016/0048347 | A1* | 2/2016 | Rangarajan | G06F 11/2092 |
| | | | | 711/156 |
| 2019/0303162 | A1* | 10/2019 | Wilkerson | G06F 9/30058 |

OTHER PUBLICATIONS

European Patent Office, Communication Pursuant to Article 94(3) dated Dec. 6, 2022 in European Patent Application No. 21190717.5 (7 pages).
European Patent Office, Office Action dated Feb. 11, 2022 in European Patent Application No. 21190717.5 (9 pages).
Martin et al., "Bandwidth Adaptive Snooping", Proceedings of the Eighth International Symposium on High-Performance Computer Architecture, Feb. 2, 2002, pp. 224-235.
European Patent Office, Communication Pursuant to Article 94(3) dated Sep. 29, 2023 in European Patent Application No. 21190717.5 (7 pages).

(Continued)

*Primary Examiner* — Eric T Oberly
(74) *Attorney, Agent, or Firm* — Trop, Pruner & Hu, P.C.

(57) ABSTRACT

In one embodiment, a fabric circuit is to receive requests for ownership and data commits from an agent. The fabric circuit includes a control circuit to maintain statistics regarding the requests for ownership and the data commits and throttle the fabric circuit based at least in part on the statistics. Other embodiments are described and claimed.

16 Claims, 8 Drawing Sheets

(56) References Cited

OTHER PUBLICATIONS

U.S. Appl. No. 16/830,468, filed Mar. 26, 2020, entitled "System, Apparatus and Method for Performing a Remote Atomic Operation Via an Interface," by Jonas Svennebring, et al.
European Patent Office, Communication Pursuant to Article 94(3) dated Feb. 2, 2024 in European Patent Application No. 21190717.5 (6 pages).
European Patent Office, Communication Pursuant to Article 94(3) dated Jul. 18, 2022 in European Patent Application No. 21190717.5 (5 pages).
European Patent Office, Response to Extended Search Report filed Jul. 8, 2022 in European Patent Application No. 21190717.5 (27 pages).
European Patent Office, Response to Official Communication Pursuant to Article 94(3) filed Nov. 28, 2022 in European Patent Application No. 21190717.5 (41 pages).
European Patent Office, Response to Official Communication Pursuant to Article 94(3) filed Apr. 5, 2023 in European Patent Application No. 21190717.5 (39 pages).
European Patent Office, Response to Official Communication Pursuant to Article 94(3) filed Feb. 8, 2024 in European Patent Application No. 21190717.5 (10 pages).

\* cited by examiner

SYSTEM, APPARATUS AND METHOD FOR CONTROLLING TRAFFIC IN A FABRIC

TECHNICAL FIELD

Embodiments relate to traffic control in a communication fabric.

BACKGROUND

In modern processors, a fabric interfaces multiple components of the processor, and receives incoming requests such as memory requests from a large number of sources. With varying and unpredictable levels of these requests, the fabric can become overwhelmed. An example of traffic flows is when committing writes from an ordered domain to an unordered coherent domain. Throughput is achieved by pipelining ownership requests for the relevant cache lines with data commit/writeback flows. The source sends out ownership requests for outstanding writes in its queue concurrently, but then commits them in order to maintain ordering. The ownership responses can come back out of order. With increasing bandwidth scaling and highly distributed architectures, the fabric is increasingly stressed, resulting in excessive re-ordering of ownership responses, which can cause excessive bandwidth degradation in a system.

DETAILED DESCRIPTION

In various embodiments, an efficient dynamic source throttling mechanism is provided to optimize an injection rate of requests from a source agent to achieve the best possible fabric bandwidth. More specifically, embodiments use statistics maintained by the source agent to determine a head-of-line blocking metric. At a high level, the source agent may use these statistics to dynamically control throttling. Such throttling may continue, after being initiated, until the head-of-line blocking metric is within allowable tolerances (e.g., either zero or very small). More accurately, control of throttling may be used to manage fabric throughput. The throttling mechanism may be implemented using an implicit hysteresis closed loop within the fabric. By way of this closed feedback loop, the source agent itself may settle on the best injection rate for sending requests from the source to the fabric. As the fabric load changes, the injection rate adjusts to obtain the optimal throughput from the fabric.

While different types of requests can be monitored, in one embodiment the head-of-line blocking metric may be determined based at least in part on statistics regarding two particular requests sent by the source input/output (IO) agent, namely requests for ownership and data commits. Note that these requests may be part of a single transaction, namely an allocating write request. At a high level, an allocating write request may be broken into three phases, first a request for ownership is sent from the source agent to the fabric. In one embodiment, this request for ownership may be implemented by issuing a request to invalidate any copies of the requested data within a cache hierarchy, to enable the source agent to modify such data. The second phase of this transaction is a global observation event, which occurs when the fabric has completed this invalidation and sent the data to the source agent. The third and final phase is when the source agent commits the data, e.g., as an ordered write to a coherent domain (say, a last level cache (LLC)).

In general, a source agent may seek to achieve high throughput by sending out a large number of ownership requests to a home agent (distributed in a CPU fabric). These can be sent out in any order, and the fabric can re-order the responses coming back. As ownership responses return from the fabric, the data is committed in a local cache or write-through buffer in the order of incoming transactions (ensuring the order is maintained for global visibility of the data updates).

Where there are enough outstanding ownership requests, the latency of getting ownership from the fabric is largely hidden. Consequently, a high throughput of pushing writes to LLC or memory can be maintained. However, without an embodiment when the fabric is under medium to heavy load due to normal system operating conditions, a high injection rate of ownership requests worsens the load further. Without an embodiment, typical imbalances in different regions of the fabric, especially in multisocket systems, cause extreme re-ordering of the ownership responses. Since the data has to be committed in order, the extreme re-ordering may cause head-of-line blocking at the IO agent. This, in turn, leads to burstiness of writeback requests which carry data, leading to more bursty traffic and significant degradation in average throughput.

With embodiments that use internal statistics to determine a head-of-line blocking metric, a source agent can settle to an optimal injection rate of traffic that gets peak throughput from the fabric. Moreover, this peak coincides with a sharp drop in head-of-line blocking as observed at the IO agent. This optimality is achieved when there is only sufficient concurrency to cause a low variance in response times for ownership requests. On the other hand, too much concurrency at high system loads causes a large variance in the response times.

Figure 1:
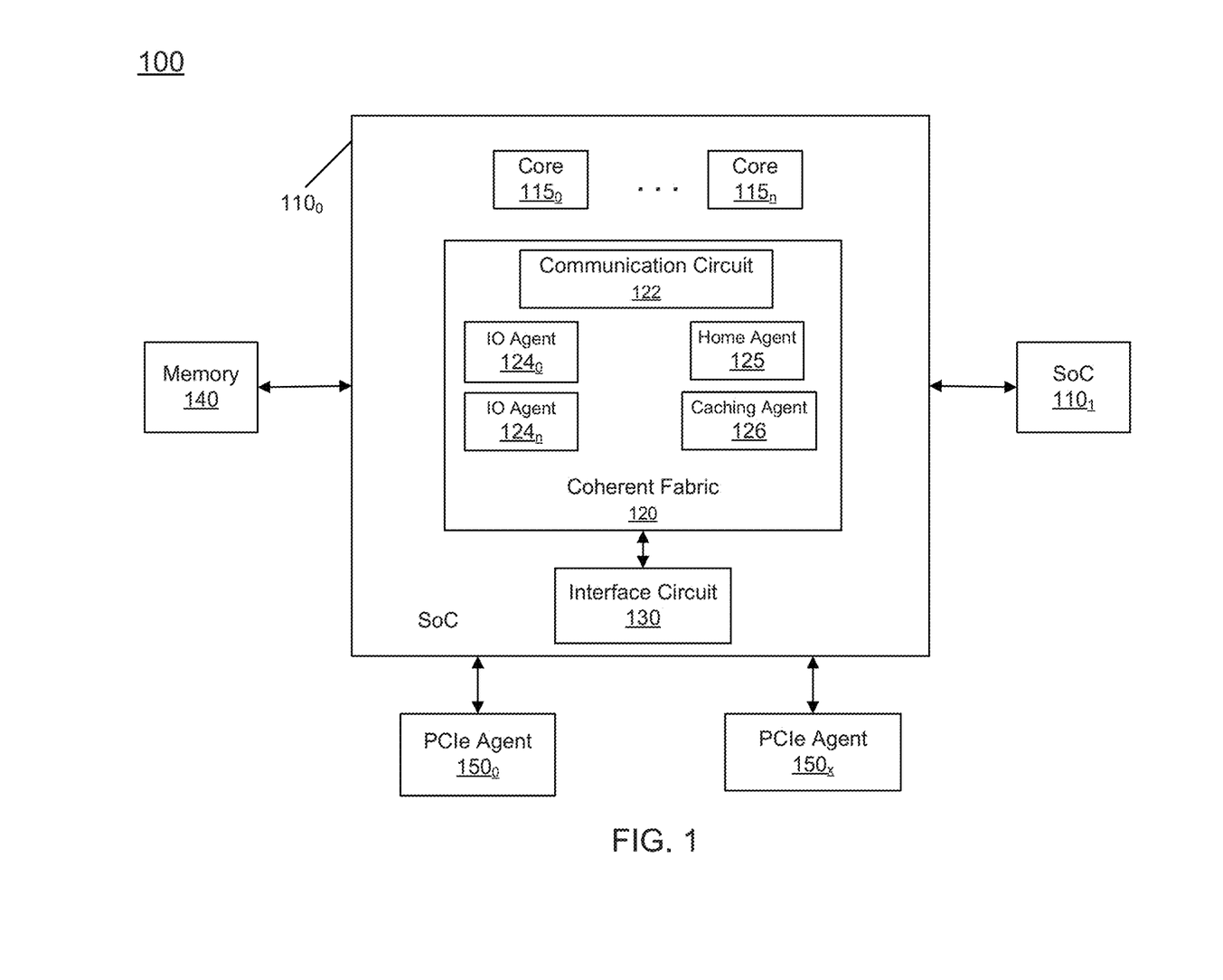
FIG. 1 is a block diagram of a system in accordance with an embodiment.

Referring now to FIG. 1, shown is a block diagram of a system in accordance with an embodiment. As shown in FIG. 1, system 100 is a computing system that may take many different forms, ranging from a small portable device to larger devices such as laptop computers, desktop computers, server computers and so forth. In the high level shown in FIG. 1, system 100 includes a plurality of SoC's 110$_{0-1}$, which may couple via an Intel® Ultra Path Interconnect, in an embodiment. High level details of SoC 110$_0$ are shown. Understand that SoC 110$_1$ may include similar components or may be a heterogeneous type of SoC. Of course, additional SoC's may be present in other embodiments.

As further shown, a plurality of PCIe agents $150_{0-x}$ are coupled to SoC 110. PCIe agents 150 may take various forms in different embodiments. However, understand that as PCIe devices, these agents send transactions in an ordered manner according to a load/store protocol. As such, incoming requests from PCIe agents 150 are ordered but non-coherent as these agents are part of an ordered non-coherent domain.

While many different types of requests may be performed, relevant here are write requests such as allocating write requests. PCIe agents 150 may send these transactions to be received in an interface circuit 130 of SoC 110, which in turn couples to a coherent fabric 120, which may be implemented as a distributed coherent fabric. As shown, fabric 120 includes a communication circuit 122, which may be implemented as a communication fabric. Coherent fabric 120 further includes a home agent 125 and a caching agent 126. In some cases, these agents may be combined in a caching and home agent (CHA). Furthermore, understand that these devices may be distributed modules, in some embodiments.

As further shown, a plurality of IO agents $124_{0-n}$ may be present, also referred to herein as fabric agents or fabric circuits. In embodiments herein, IO agents 124 also may be distributed, with each agent associated with a given device such as a corresponding PCIe agent 150. To this end, IO agents 124 may implement embodiments of source throttling as described herein. As further shown, coherent fabric 120 also couples to a plurality of cores $115_{0-n}$. Understand that these cores may be homogeneous or heterogeneous processing cores in different embodiments.

As further illustrated, a memory 140 couples to SoC 110. Some requests from PCIe agents 150 may target memory 140, which is local to SoC 110. In other cases, such requests may target remote memory that is local to another SoC. Although shown at this high level in the embodiment of FIG. 1, many variations are possible.

Figure 2:
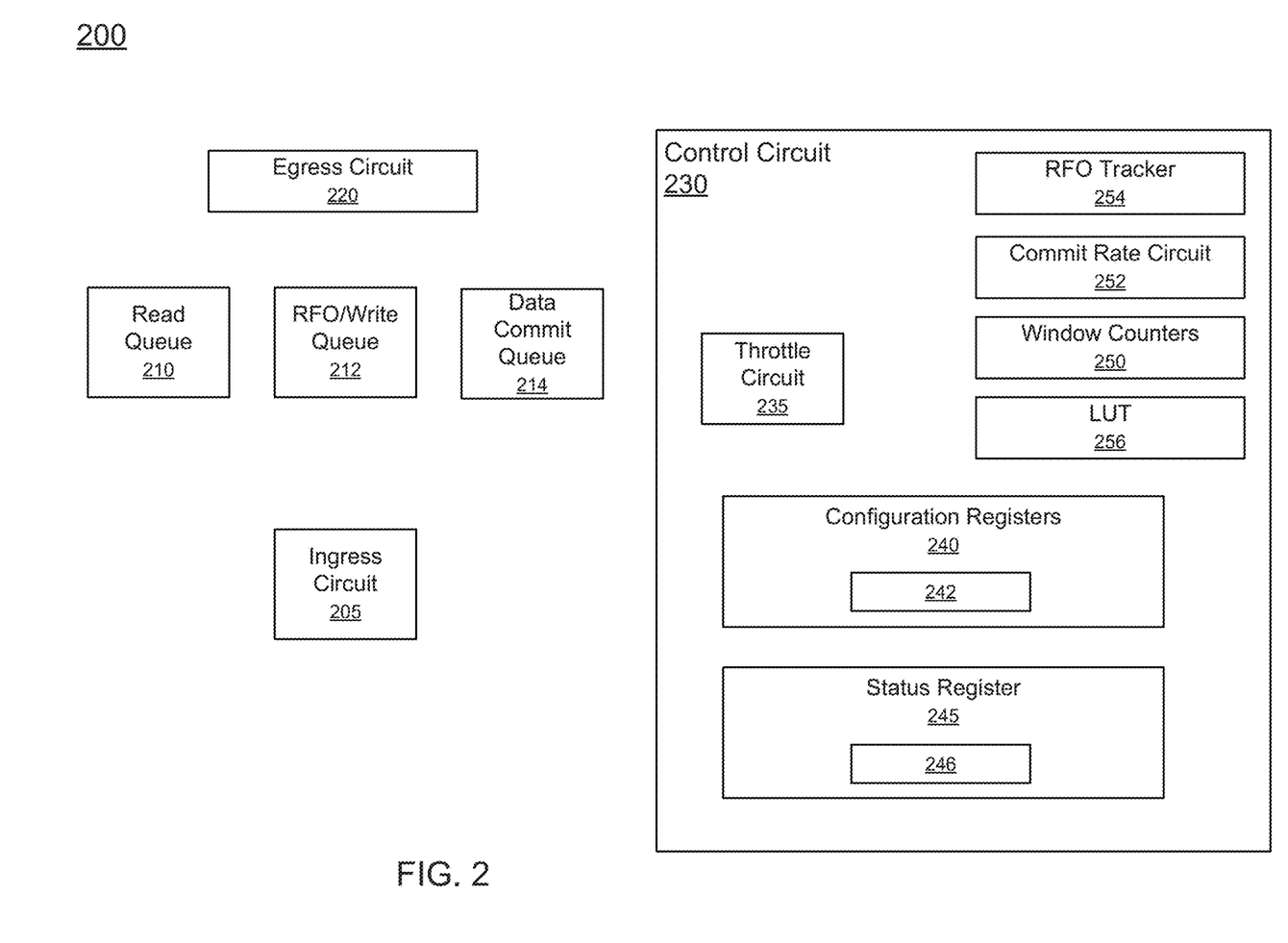
FIG. 2 is a block diagram of a fabric in accordance with an embodiment.

Referring now to FIG. 2, shown is a block diagram of a fabric in accordance with an embodiment. As shown in FIG. 2, fabric 200 includes various hardware circuitry. One example source agent is IO agent 124 of FIG. 1. To enable input and output of requests from a given source device, fabric 200 includes an ingress circuit 205 and an egress circuit 220. In other embodiments, these circuits may be collectively implemented as an input/output circuit. Fabric 200 further includes various hardware storages such as queues to store information associated with various request types. In the embodiment shown, these queues include a read queue 210 to store information associated with read requests, an RFO or write queue 212 to store information associated with RFOs, and a data commit queue 214 to store information associated with data commits, namely write-backs.

To ensure high throughput of requests, a control circuit 230 is configured to control operation of communications through fabric 200. In addition, control circuit 230 further includes a throttle circuit 235 to implement the dynamic source throttling of outgoing requests from fabric 200 as described herein. To enable throttle circuit 235 to dynamically control such throttling, information may be accessed in various hardware components. These components include an RFO tracker 254, which may be configured to track occupancy level of queue 212, and a commit rate circuit 252 that may maintain statistics regarding a data commit rate. In addition, throttle circuit 235 may leverage information in a set of window counters 250, details of which are described further below.

Throttle circuit 235, to perform dynamic throttling in accordance with an embodiment, also may access information in a set of configuration registers 240, including first configuration registers 242 which may store various configuration information for performing throttling as described herein. In addition, at least one status register 245 may be present. As seen, a throttle flag 246 may be present within status register 245, which when set may enable throttling as described herein. As further shown, throttle circuit 235 may access throttle control steps present in a lookup table 256, described further herein. Understand while shown at this high level in the embodiment of FIG. 2, many variations and alternatives are possible.

Figure 3:
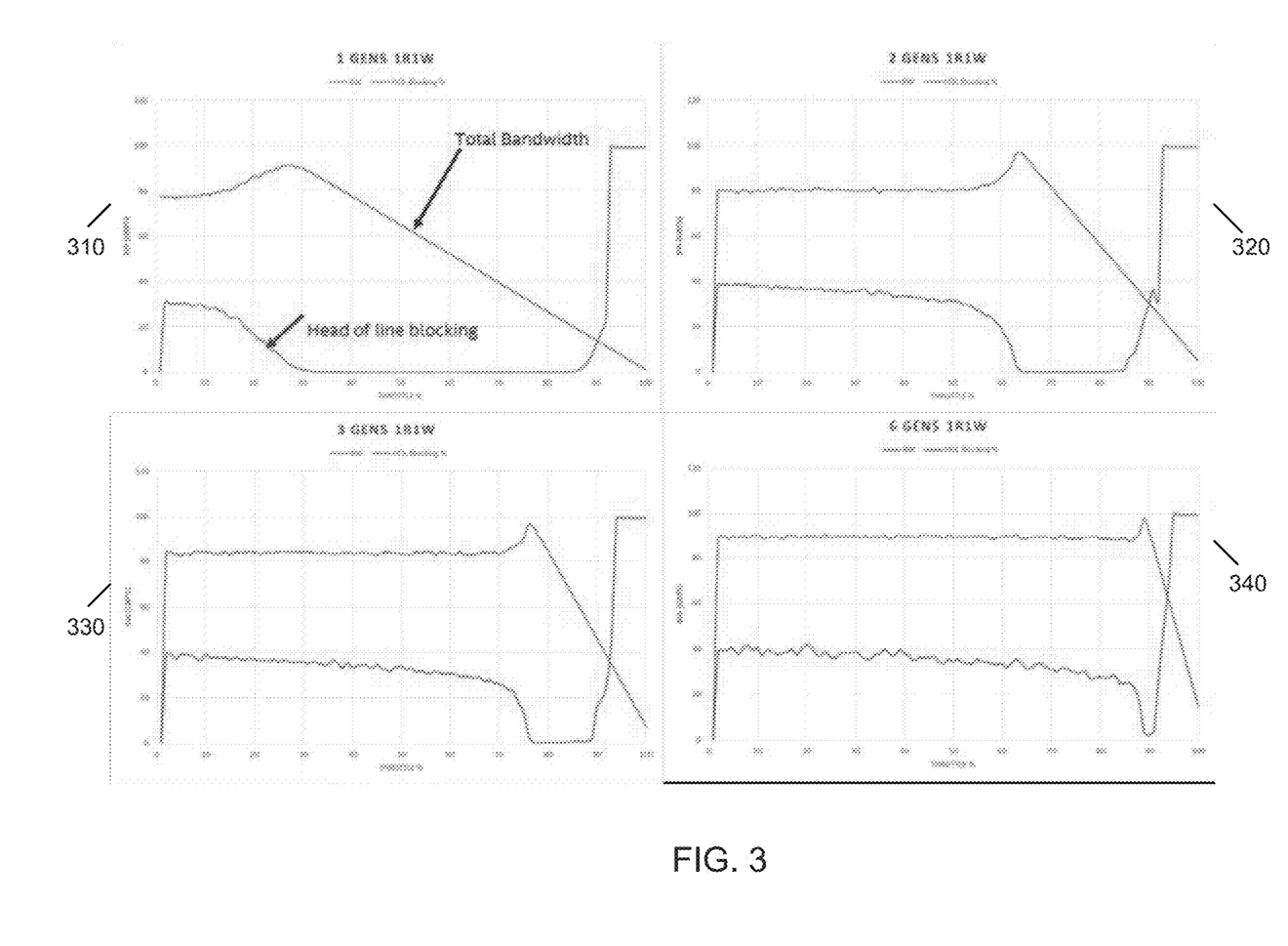
FIG. 3 are graphical illustrations of a performance model demonstrating effects of source throttling on total throughput of a fabric in accordance with an embodiment.

Referring now to FIG. 3, shown are graphical illustrations of a performance model demonstrating effects of source throttling on total throughput of a fabric in accordance with an embodiment. As shown in FIG. 3, each graph 310-340 illustrates the addition of another PCIe (e.g., Gen 5) agent (with 1, 2, 3, and 6 agents) injecting reads and writes (a pattern of one read and one write) into a bottlenecked fabric. It is seen that only ~80% of the throughput is reached and the onset of head-of-line blocking is immediate. On increasing the throttling (i.e., decreasing injection from each source), there is a region where the head-of-line blocking decreases significantly and peak throughput is reached. When each source agent implements source throttling as described herein, injection rate may be stabilized based on observed head-of-line blocking at the IO agent. Thus as seen, as throttling is increased (moving rightward on the X-axis) blocking decreases. However, total bandwidth decreases. In embodiments, an optimal balancing of head-of-line blocking and peak throughput may occur.

In a particular embodiment, the IO agent measures head-of-line blocking over small windows of time by using its data commit rate and ownership request tracker occupancy. More specifically, if the ownership request tracker occupancy is greater than a first threshold and the data commit rate is less than another threshold, then that particular window of time is qualified as a "bad" window, else it is a "good" window. Two sets of a count of bad windows is maintained, one over "X_right" number of windows and one over "X_left" number of windows. If the number of bad windows over "X_right" windows is above a window count threshold, then the IO agent sets a throttle flag. If this throttle flag is set and the current window is bad, the IO agent may decrease its injection of traffic into the fabric (a.k.a. throttle), corresponding to moving the operating point in the rightward direction in FIG. 3. If the number of bad windows over "X_left" windows is less than another window count threshold, the flag is reset, and the IO agent increases its injection rate (a.k.a decreases throttling) corresponding to moving the operating point leftward in FIG. 3.

In essence, as the head-of-line blocking increases, the IO agent throttles itself until it observes the head-of-line blocking drop and stays there (this is the operating point of peak throughput). Subsequently if the fabric load is removed, the IO agent increases its injection rate as well. If all IO agents on the system behave this way, the fabric recovers much faster and is able to sustain a much better throughput.

Figure 4:
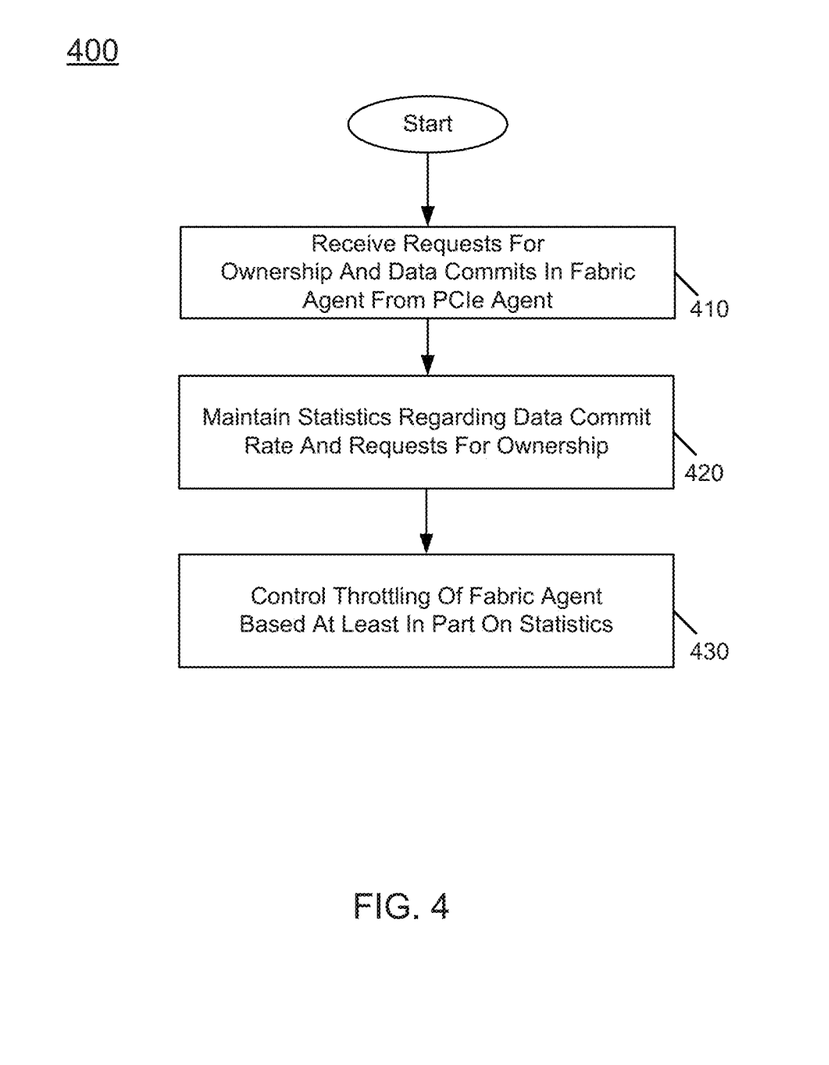
FIG. 4 is a flow diagram of a method in accordance with an embodiment.

With configuration registers, a user can control parameters of source throttling based on workloads or for other variations in operation. These configuration parameters may include, in an implementation (and which may be stored in configuration registers 242 of FIG. 2):

1) Base Window size
2) Number of base windows after which throttling is evaluated (X_right)
3) Number of base windows after which decreasing throttling is evaluated (X_left)
4) Throttle Step size registers (this can be implemented as a lookup table such as lookup table 256 of FIG. 2 to lookup the throttle value based on a metric like current throttle or bandwidth)
5) Head-of-line detection registers (combination of occupancy thresholds and the rate of issuing writebacks to the fabric)
6) Bad window threshold Referring now to FIG. 4, shown is a flow diagram of a method in accordance with an embodiment. As shown in FIG. 4 method 400 is a method for performing source throttling in accordance with an embodiment. As such, method 400 may be performed by a fabric agent (such as one of IO agents 124 in FIG. 1) associated with a source device such as a given PCIe device. As such, method 400 may be performed by hardware circuitry, firmware, software unit/or combinations thereof. In a particular embodiment, method 400 may be performed by a control circuit within the fabric agent.

As illustrated, method 400 begins by receiving write requests, e.g., requests for ownership and data commits from the agent in the fabric (block 410). For example, an interface circuit of the PCIe agent may send these requests to the fabric via a link that couples the agent to the fabric, e.g., a PCIe or other such link. Next, at block 420 the fabric agent may maintain statistics regarding various operating parameters. Specifically, a control circuit of the fabric agent may maintain statistics regarding a data commit rate and pending requests for ownership. Of course understand that additional or different statistics may be maintained in other implementations.

Still with reference to FIG. 4, next at block 430 the control circuit may control throttling of the agent based at least in part on the statistics. For example, it may be determined, based at least in part on the statistics, that the data commit rate is relatively low and the number of pending requests for ownership is relatively high. Thus the fabric is heavily loaded and suffers from poor throughput. Accordingly, by throttling injection of requests at the source, better throughput can be achieved. Of course understand that the control circuit also may reduce or stop throttling request injection when it is determined based upon the statistics that the data commit rate is relatively high and pending requests for ownership are relatively low, indicating sufficient throughput in the fabric. Understand while shown at this high level in the embodiment of FIG. 4, many variations and alternatives.

Figure 5:
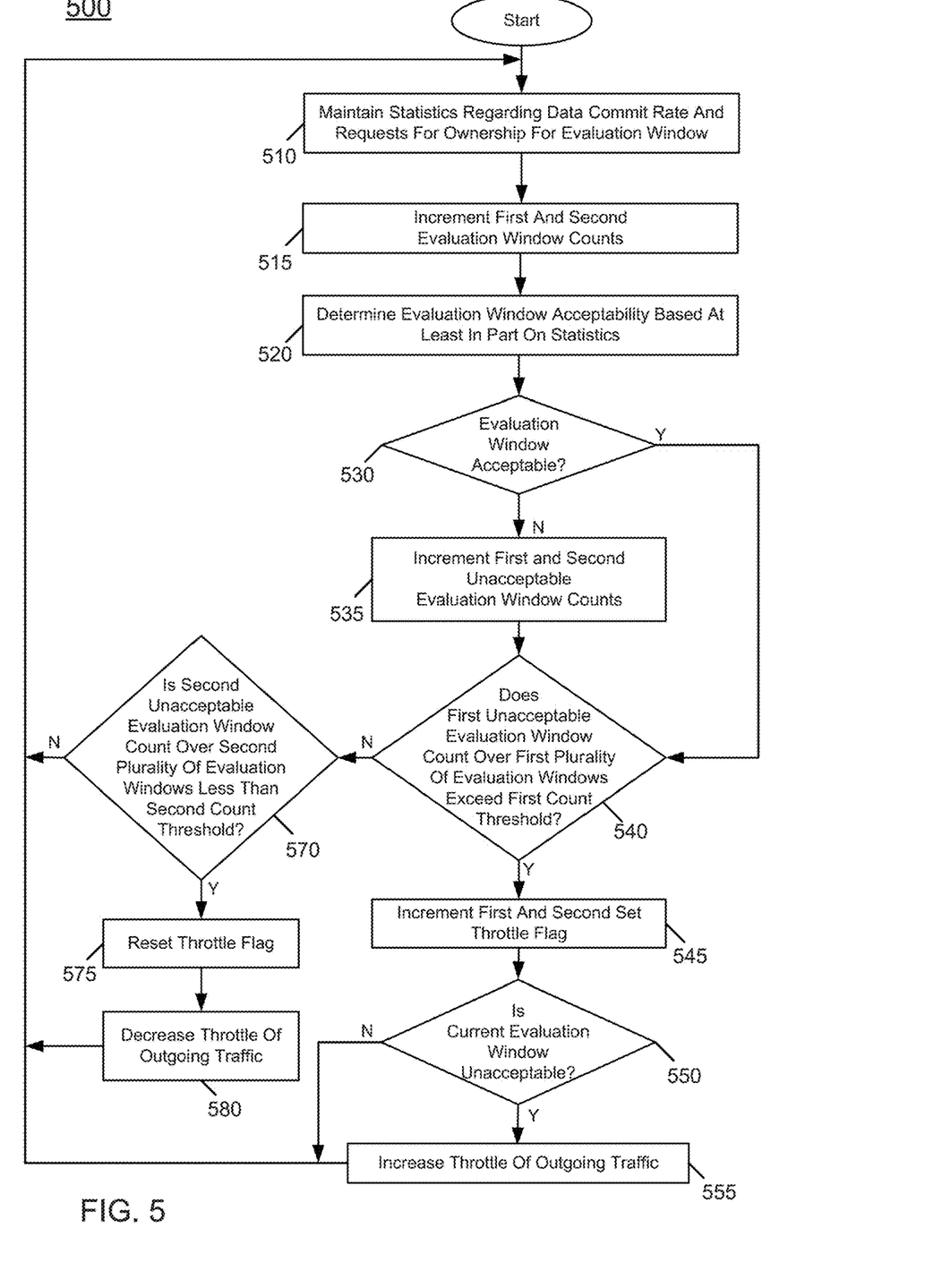
FIG. 5 is a flow diagram of a method in accordance with another embodiment.

Referring now to FIG. 5, shown is a flow diagram of a method in accordance with another embodiment. More specifically, method 500 is a more detailed method for performing source throttling in accordance with an embodiment. Method 500 may be performed by a fabric agent associated with a source device. As such, method 500 may be performed by hardware circuitry, firmware, software and/or combinations thereof, such as a control circuit within the fabric agent.

As illustrated, method 500 begins by maintaining statistics regarding various operating parameters for an evaluation interval (also referred to as a base window) (block 510). In an embodiment, a data commit rate and a level of pending requests for ownership may be determined. Next at block 515, first and second counts of evaluation windows may be incremented. These evaluation window counts are, respectively, counts of a number of evaluation windows that the control circuit has undertaken since a last throttle determination and a last throttle decrease determination were made. Next at block 520 it may be determined whether the now completed evaluation window was acceptable. This determination of evaluation window acceptability may be based at least in part on the statistics. For example, an evaluation window may be deemed acceptable where its data commit rate is greater than a first threshold and its pending requests for ownership, e.g., as determined by tracker occupancy level, are less than a second threshold. Based on this analysis it is determined at diamond 530 whether the evaluation window is acceptable. Understand of course acceptability of a given evaluation window may be determined in another manner in other embodiments. If the evaluation window is not determined to be acceptable, control passes to block 535 where first and second unacceptable evaluation window counts may be incremented. Understand that these two different counts each may be associated with different analysis windows, as described further below.

Still with reference to FIG. 5, next at diamond 540 it may be determined whether the first unacceptable evaluation window count over a first number of evaluation windows exceeds a first count threshold. This first number of evaluation windows may correspond to a number of base evaluation windows after which throttling is evaluated ("X_right" as described above). Note that if the first number of evaluation windows has not yet reached this first plurality of evaluation windows, the determination at diamond 440 does not occur, and control passes to diamond 570, discussed below.

Otherwise, when the first count of evaluation windows meets this first plurality of evaluation windows level, it is determined whether the number of unacceptable evaluation windows exceeds the first count threshold. If so, control passes to block 545 where a throttle flag may be set, e.g., in a status register. Next, control passes to diamond 550 to determine whether the current evaluation window, namely the just completed evaluation window, is unacceptable. If so, at block 555, throttling of outgoing traffic may be initiated or increased. In one embodiment, throttling may be effected by reducing an injection rate to the fabric from the source agent.

As one example, based upon the number of unacceptable windows, a lookup table may be accessed to identify the level of throttling to occur. For example, assume that this number of unacceptable evaluation windows is 10 (over a X-right window count of 40). In this example, a value of 10 may be used to access an entry of the lookup table that stores a given throttle level, which is used to effect the desired throttle rate. Understand that other throttling mechanisms may be used in other embodiments. At this point, analysis of a throttle increase decision is completed, and the first count of evaluation windows and the first count of unacceptable evaluation windows may be reset (not shown for ease of illustration in FIG. 5) Then, control passes back to block 510, discussed above.

Similar operation may proceed as above for throttle decrease determinations, which may be made at a slower rate than throttle increase determinations, to provide a measure of hysteresis. For example, the second number of evaluation windows may be approximately an order of magnitude larger than the first number of evaluation windows. Thus at diamond 570 it may be determined whether the second unacceptable evaluation window count over a second number of evaluation windows is less than a second count threshold. This second number of evaluation windows may correspond to a number of base evaluation windows after which a throttling decrease is evaluated ("X_left" as described above). Note that if the second count of evaluation windows has not yet reached this second plurality of evaluation windows, the determination at diamond 570 does not occur, and control passes to block 510.

Otherwise, when the second count of evaluation windows meets this second plurality of evaluation windows level, it is determined whether the second number of unacceptable evaluation windows is less than the second count threshold. If so, control passes to block 575 where the throttle flag may be reset. Next at block 580, throttling of outgoing traffic may be decreased. At this point, analysis of a throttle decrease decision is completed, and the second count of evaluation windows and the second count of unacceptable evaluation windows may be reset (not shown for ease of illustration in FIG. 5) Then, control passes back to block 510, discussed above. Understand while shown at this high level in the embodiment of FIG. 5, many variations and alternatives are possible.

Embodiments may realize a performance upside for both remote traffic and local traffic mixed with remote traffic. Embodiments that implement source throttling may remain effective as the number of agents increase. Additionally, no degradation in performance occurs when the fabric is not the bottleneck. In this way, bandwidth loss is prevented due to head-of-line blocking across a wide range of workloads and topologies.

Referring to Table 1 below, shown is a performance model across various workloads using an embodiment herein in implementations with a given number of active PCIe agents sending traffic to a socket. As seen, a performance upside of as much as 18% for remote traffic, namely for traffic that targets memory coupled to a remote socket, and as high as 62% for local traffic mixed with remote traffic, can be realized. Without source throttling, the agent targeting local memory loses performance by being stuck behind traffic from agents targeting remote memory.

TABLE 1

| | Number of Active Agents | | | | |
| --- | --- | --- | --- | --- | --- |
| | 1 Gen5 100% remote | 2 Gen5 100% remote | 3 Gen5 100% remote | 4 Gen5 3 remote, 1 local | 5 Gen5 4 remote, 1 local |
| % improvement with source throttling | 17% | 18% | 15% | 42% | 62% |

Understand that in other embodiments, fabric loading may be estimated via different metrics such as queue occupancies alone or using response times of ownership requests. Embodiments provide fine-grained resolution that enables throttling to work across a wide variety of fabric topologies and fabric loads without any significant tuning.

Figure 6:
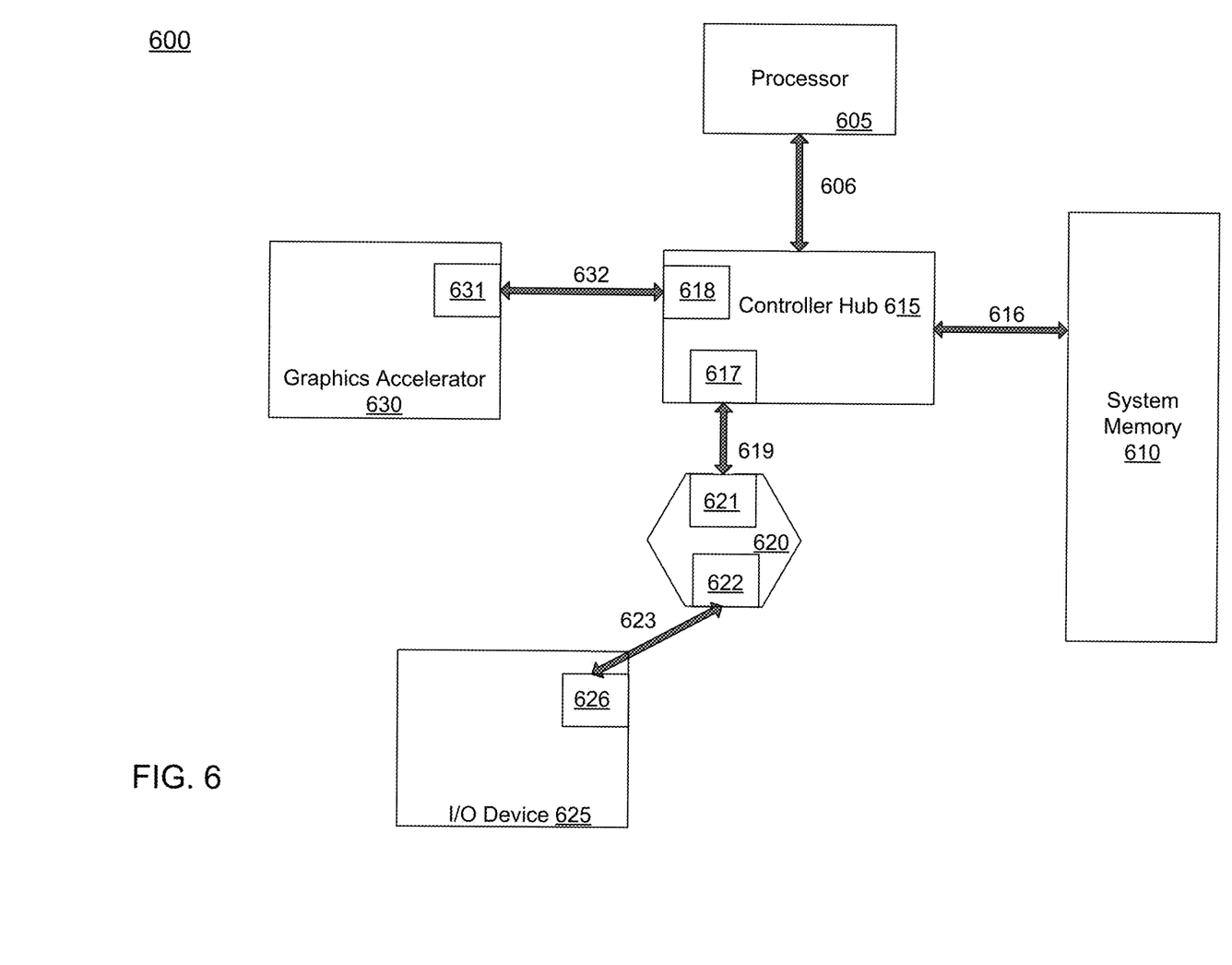
FIG. 6 is an embodiment of a fabric composed of point-to-point links that interconnect a set of components.

Embodiments may be implemented in a wide variety of interconnect structures. Referring to FIG. 6, an embodiment of a fabric composed of point-to-point links that interconnect a set of components is illustrated. System 600 includes processor 605 and system memory 610 coupled to controller hub 615. Processor 605 includes any processing element, such as a microprocessor, a host processor, an embedded processor, a co-processor, or other processor. Processor 605 is coupled to controller hub 615 through front-side bus (FSB) 606. In one embodiment, FSB 606 is a serial point-to-point interconnect.

System memory 610 includes any memory device, such as random access memory (RAM), non-volatile (NV) memory, or other memory accessible by devices in system 600. System memory 610 is coupled to controller hub 615 through memory interface 616. Examples of a memory interface include a double-data rate (DDR) memory interface, a dual-channel DDR memory interface, and a dynamic RAM (DRAM) memory interface.

In one embodiment, controller hub 615 is a root hub, root complex, or root controller in a PCIe interconnection hierarchy. Such device may include a fabric to perform source throttling, as described herein. Examples of controller hub 615 include a chipset, a memory controller hub (MCH), a northbridge, an interconnect controller hub (ICH), a southbridge, and a root controller/hub. Often the term chipset refers to two physically separate controller hubs, i.e. a memory controller hub (MCH) coupled to an interconnect controller hub (ICH). Note that current systems often include the MCH integrated with processor 605, while controller 615 is to communicate with I/O devices, in a similar manner as described below. In some embodiments, peer-to-peer routing is optionally supported through root complex 615.

Here, controller hub 615 is coupled to switch/bridge 620 through serial link 619. Input/output modules 617 and 621, which may also be referred to as interfaces/ports 617 and 621, include/implement a layered protocol stack to provide communication between controller hub 615 and switch 620. In one embodiment, multiple devices are capable of being coupled to switch 620.

Switch/bridge 620 routes packets/messages from device 625 upstream, i.e., up a hierarchy towards a root complex, to controller hub 615 and downstream, i.e., down a hierarchy away from a root controller, from processor 605 or system memory 610 to device 625. Switch 620, in one embodiment, is referred to as a logical assembly of multiple virtual PCI-to-PCI bridge devices. Device 625 includes any internal or external device or component to be coupled to an electronic system, such as an I/O device, a Network Interface Controller (NIC), an add-in card, an audio processor, a network processor, a memory expander, a hard-drive, a storage device, a CD/DVD ROM, a monitor, a printer, a mouse, a keyboard, a router, a portable storage device, a Firewire device, a Universal Serial Bus (USB) device, a scanner, and other input/output devices.

Graphics accelerator 630 is also coupled to controller hub 615 through serial link 632. In one embodiment, graphics accelerator 630 is coupled to an MCH, which is coupled to an ICH. Switch 620, and accordingly I/O device 625, is then coupled to the ICH. I/O modules 631 and 618 are also to implement a layered protocol stack to communicate between graphics accelerator 630 and controller hub 615. A graphics controller or the graphics accelerator 630 itself may be integrated in processor 605.

Figure 7:
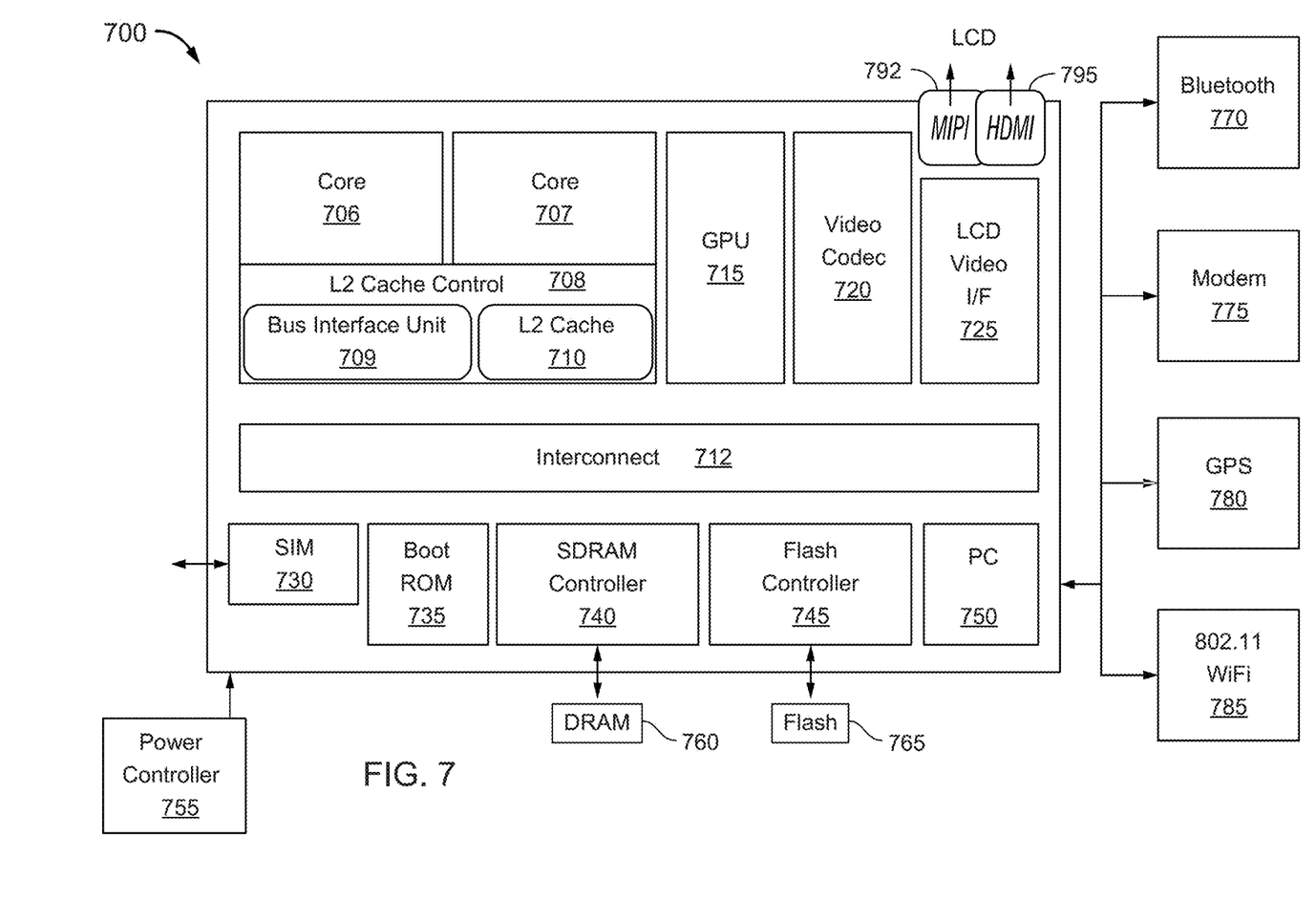
FIG. 7 is an embodiment of a system-on-chip design in accordance with an embodiment.

Turning next to FIG. 7, an embodiment of a SoC design in accordance with an embodiment is depicted. As a specific illustrative example, SoC 700 may be configured for insertion in any type of computing device, ranging from portable device to server system. Here, SoC 700 includes 2 cores 706 and 707. Cores 706 and 707 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 706 and 707 are coupled to cache controller 708 that is associated with bus interface unit 709 and L2 cache 710 to communicate with other parts of system 700 via an interconnect 712. Interconnect 712 may include a fabric to perform source throttling, as described herein.

Interconnect 712 provides communication channels to the other components, such as a Subscriber Identity Module (SIM) 730 to interface with a SIM card, a boot ROM 735 to hold boot code for execution by cores 706 and 707 to initialize and boot SoC 700, a SDRAM controller 740 to interface with external memory (e.g., DRAM 760), a flash controller 745 to interface with non-volatile memory (e.g., flash 765), a peripheral controller 750 (e.g., an eSPI interface) to interface with peripherals, video codec 720 and video interface 725 to display and receive input (e.g., touch enabled input), GPU 715 to perform graphics related computations, etc. In addition, the system illustrates peripherals for communication, such as a Bluetooth module 770, 3G modem 775, GPS 1080, and WiFi 785. Also included in the system is a power controller 755. Further illustrated in FIG. 7, system 700 may additionally include interfaces including a MIPI interface 792, e.g., to a display and/or an HDMI interface 795 also which may couple to the same or a different display.

Figure 8:
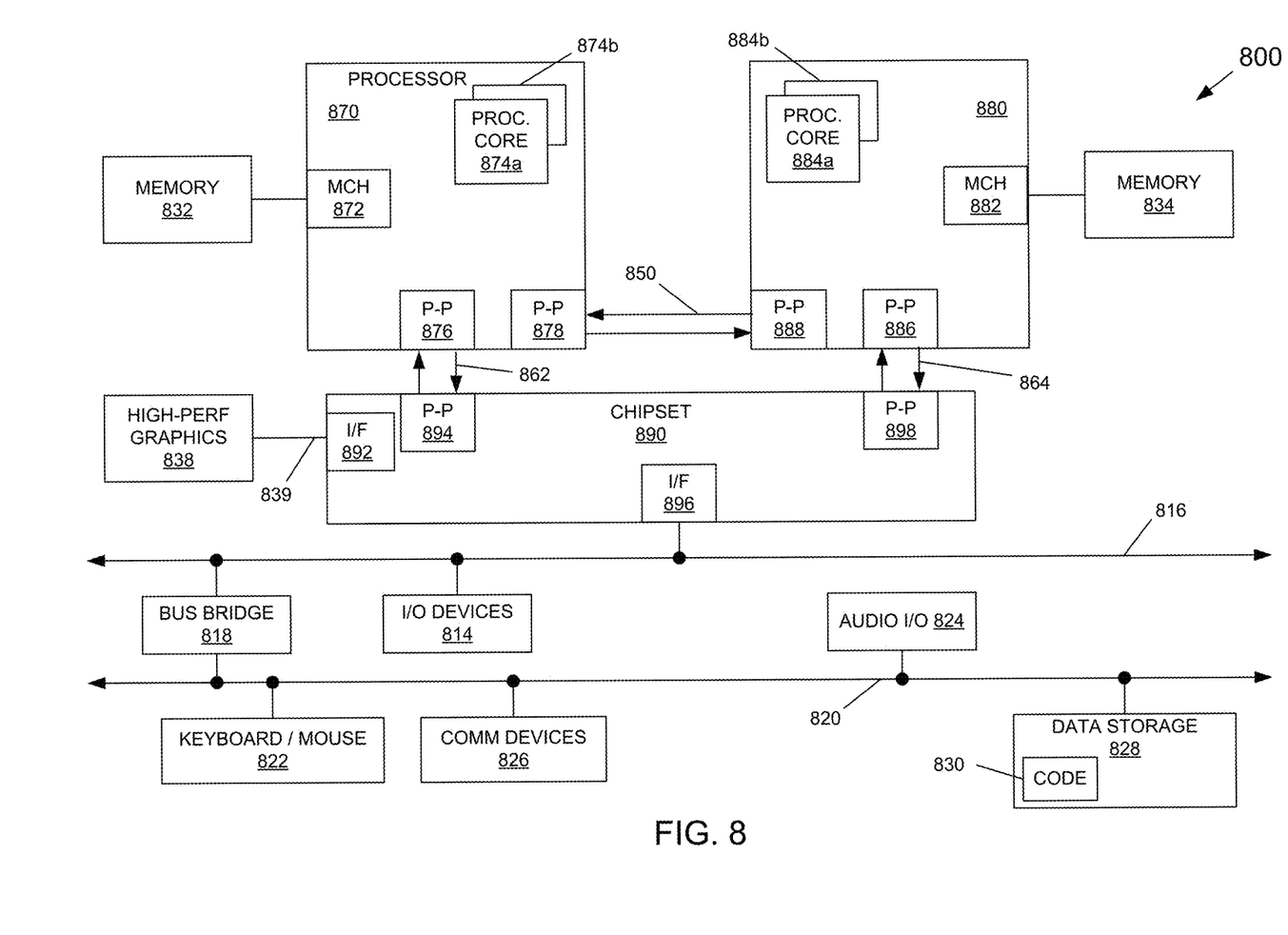
FIG. 8 is a block diagram of a system in accordance with an embodiment of the present invention.

Referring now to FIG. 8, shown is a block diagram of a system in accordance with an embodiment of the present invention. As shown in FIG. 8, multiprocessor system 800 includes a first processor 870 and a second processor 880 coupled via a point-to-point interconnect 850. As shown in FIG. 8, each of processors 870 and 880 may be many core processors including representative first and second processor cores (i.e., processor cores 874*a* and 874*b* and processor cores 884*a* and 884*b*). In an embodiment, processors 870 and 880 and other components may include fabrics that perform source throttling, as described herein.

Still referring to FIG. 8, first processor 870 further includes a memory controller hub (MCH) 872 and point-to-point (P-P) interfaces 876 and 878. Similarly, second processor 880 includes a MCH 882 and P-P interfaces 886 and 888. As shown in FIG. 8, MCH's 872 and 882 couple the processors to respective memories, namely a memory 832 and a memory 834, which may be portions of system memory (e.g., DRAM) locally attached to the respective processors. First processor 870 and second processor 880 may be coupled to a chipset 890 via P-P interconnects 862 and 864, respectively. As shown in FIG. 8, chipset 890 includes P-P interfaces 894 and 898.

Furthermore, chipset 890 includes an interface 892 to couple chipset 890 with a high performance graphics engine 838, by a P-P interconnect 839. As shown in FIG. 8, various input/output (I/O) devices 814 may be coupled to first bus 816, along with a bus bridge 818 which couples first bus 816 to a second bus 820. Various devices may be coupled to second bus 820 including, for example, a keyboard/mouse 822, communication devices 826 and a data storage unit 828 such as a disk drive or other mass storage device which may include code 830, in one embodiment. Further, an audio I/O 824 may be coupled to second bus 820.

The following examples pertain to further embodiments.

In one example, an apparatus comprises a fabric circuit associated with a first agent to couple to the apparatus, where the fabric circuit is to receive requests for ownership and data commits from the first agent. The fabric circuit may include: a control circuit to maintain statistics regarding the requests for ownership and the data commits and throttle the fabric circuit based at least in part on the statistics; and a communication circuit coupled to the fabric circuit.

In an example, the fabric circuit further comprises: a tracker to track the requests for ownership; and a commit rate circuit to determine a rate of the data commits.

In an example, the statistics comprise an occupancy level of the tracker and the rate of the data commits.

In an example, the control circuit is to throttle the fabric circuit when the occupancy level exceeds a first threshold and the rate of the data commits is less than a second threshold.

In an example, the control circuit is to throttle the fabric circuit by reduction of a rate of sending of at least one of the data commits or the requests for ownership to the communication circuit.

In an example, the apparatus further comprises a plurality of configuration registers to maintain configuration information for the control circuit, the configuration information comprising the first threshold, the second threshold, a first count threshold, and a second count threshold.

In an example, the apparatus further comprises another register to store a throttle flag.

In an example, the control circuit, in response to the occupancy level exceeding the first threshold and the rate of the data commits being less than the second threshold, to update first and second counts of unacceptable windows.

In an example, the control circuit is to set the throttle flag based on comparison of the first count of unacceptable windows to the first count threshold.

In an example, the control circuit is to update a throttle of the fabric circuit when the throttle flag is set and the occupancy level exceeds the first threshold and the rate of the data commits is less than the second threshold.

In an example, the control circuit is to reset the throttle flag based on comparison of the second count of unacceptable windows to the second count threshold.

In an example, the control circuit is to reduce the throttle of the fabric circuit when the throttle flag is reset.

In another example, a method comprises: receiving, in a first agent of a fabric of a processor, requests for ownership and data commits from a first device coupled to the processor; maintaining statistics regarding the requests for ownership and the data commits; and throttling, in the first agent, sending of at least some of the requests for ownership and the data commits from the first agent to one or more other agents of the fabric.

In an example, the method further comprises monitoring the statistics for an evaluation window.

In an example, the method further comprises determining a head-of-line metric based on the statistics for the evaluation window.

In an example, the method further comprises identifying the evaluation window as an unacceptable window based at least in part on the head-of-line metric.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In yet another example, a system includes a first SoC comprising a first plurality of cores and a coherent fabric coupled to the first plurality of cores, the coherent fabric comprising a plurality of fabric agents, at least one of the fabric agents associated with a PCIe device coupled to the first SoC. Each of the plurality of fabric agents may comprise: input/output circuitry to receive requests for ownership and data commits from the associated PCIe device and send the requests for ownership and the data commits to at least one other agent of the coherent fabric; and a control circuit to maintain statistics regarding the requests for ownership and the data commits and throttle the input/output circuitry based at least in part on the statistics. The system may further include a system memory coupled to the first SoC and a first PCIe device coupled to the first SoC.

In an example, the system further comprises a second SoC coupled to the first SoC, where a first fabric agent of the first SoC is to direct a first request from the first PCIe device to the system memory and direct a second request from the first PCIe device to the second SoC.

In an example, the control circuit is to determine a metric based at least in part on the statistics obtained during an evaluation window.

In an example, the control circuit is to throttle the input/output circuitry based at least in part on the metric.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
    a fabric circuit associated with a first agent to couple to the apparatus, wherein the fabric circuit is to receive requests for ownership and data commits from the first agent, the fabric circuit comprising:
        a control circuit to maintain statistics regarding the requests for ownership and the data commits and throttle the fabric circuit based at least in part on the statistics, the statistics comprising an occupancy level of a tracker and a rate of the data commits, wherein the control circuit is to throttle the fabric circuit when the occupancy level exceeds a first threshold and the rate of the data commits is less than a second threshold; and
    a communication circuit coupled to the fabric circuit.

2. The apparatus of claim 1, wherein the fabric circuit further comprises:
    the tracker to track the requests for ownership; and
    a commit rate circuit to determine the rate of the data commits.

3. The apparatus of claim 1, wherein the control circuit is to throttle the fabric circuit by reduction of a rate of sending of at least one of the data commits or the requests for ownership to the communication circuit.

4. The apparatus of claim 1, further comprising a plurality of configuration registers to maintain configuration information for the control circuit, the configuration information comprising the first threshold, the second threshold, a first count threshold, and a second count threshold.

5. The apparatus of claim 4, further comprising another register to store a throttle flag.

6. The apparatus of claim 5, wherein the control circuit, in response to the occupancy level exceeding the first threshold and the rate of the data commits being less than the second threshold, to update first and second counts of unacceptable windows.

7. The apparatus of claim 6, wherein the control circuit is to set the throttle flag based on comparison of the first count of unacceptable windows to the first count threshold.

8. The apparatus of claim 7, wherein the control circuit is to update the throttle of the fabric circuit when the throttle flag is set and the occupancy level exceeds the first threshold and the rate of the data commits is less than the second threshold.

9. The apparatus of claim 7, wherein the control circuit is to reset the throttle flag based on comparison of the second count of unacceptable windows to the second count threshold.

10. The apparatus of claim 9, wherein the control circuit is to reduce the throttle of the fabric circuit when the throttle flag is reset.

11. A non-transitory machine-readable medium having stored thereon instructions, which if performed by a machine cause the machine to perform a method comprising:
   receiving, in a first agent of a fabric of a processor, requests for ownership and data commits from a first device coupled to the processor;
   maintaining statistics regarding the requests for ownership and the data commits;
   monitoring the statistics for an evaluation window, and determining a head-of-line metric based on the statistics for the evaluation window; and
   throttling, in the first agent, sending of at least some of the requests for ownership and the data commits from the first agent to one or more other agents of the fabric.

12. The non-transitory machine-readable medium of claim 11, wherein the method further comprises identifying the evaluation window as an unacceptable window based at least in part on the head-of-line metric.

13. A system comprising:
   a first system on chip (SoC) comprising a first plurality of cores and a coherent fabric coupled to the first plurality of cores, the coherent fabric comprising a plurality of fabric agents, at least one of the plurality of fabric agents associated with a Peripheral Component Interconnect Express (PCIe) device coupled to the first SoC, wherein each of the plurality of fabric agents comprises:
      input/output circuitry to receive requests for ownership and data commits from the associated PCIe device and send the requests for ownership and the data commits to at least one other agent of the coherent fabric; and
      a control circuit to maintain statistics regarding the requests for ownership and the data commits and throttle the input/output circuitry based at least in part on the statistics, the statistics comprising an occupancy level of a tracker and a rate of the data commits, wherein the control circuit is to throttle the input/output circuitry when the occupancy level exceeds a first threshold and the rate of the data commits is less than a second threshold;
   a system memory coupled to the first SoC; and
   a first PCIe device coupled to the first SoC.

14. The system of claim 13, further comprising a second SoC coupled to the first SoC, wherein a first fabric agent of the first SoC is to direct a first request from the first PCIe device to the system memory and direct a second request from the first PCIe device to the second SoC.

15. The system of claim 13, wherein the control circuit is to determine a metric based at least in part on the statistics obtained during an evaluation window.

16. The system of claim 15, wherein the control circuit is to throttle the input/output circuitry based at least in part on the metric.

* * * * *